United States Patent [19]
Bayya et al.

[11] Patent Number: 5,385,882
[45] Date of Patent: Jan. 31, 1995

[54] PROCESS FOR PREPARING A THALLIUM-CONTAINING SUPERCONDUCTOR

[75] Inventors: Shyam S. Bayya; Robert L. Synder; Sudhakar Gopalakrishman, all of Alfred; Walter A. Schulze, Alfred Station, all of N.Y.

[73] Assignee: Alfred Univeristy, Alfred, N.Y.

[21] Appl. No.: 966,019

[22] Filed: Dec. 9, 1992

Related U.S. Application Data

[63] Continuation-in-part of Ser. No. 684,309, Apr. 12, 1991, Pat. No. 5,270,293.

[51] Int. Cl.$^6$ .............. H01B 12/00; H01L 39/12
[52] U.S. Cl. .............. 505/501; 505/729; 505/782; 505/783; 505/783; 252/518; 252/521
[58] Field of Search .............. 505/1, 783, 729, 782; 252/528, 521

[56] References Cited

U.S. PATENT DOCUMENTS

| | | | |
|---|---|---|---|
| 4,929,594 | 5/1990 | Gopalakrishnan | 505/783 |
| 5,039,653 | 8/1991 | Jackon | 505/1 |
| 5,043,319 | 8/1991 | Arendt | 505/1 |
| 5,096,879 | 3/1992 | Arendt | 505/1 |

FOREIGN PATENT DOCUMENTS

| | | | |
|---|---|---|---|
| 2055283 | 2/1990 | Japan | 505/782 |
| 0097422 | 4/1990 | Japan | 505/783 |
| 4037607 | 2/1992 | Japan | 505/783 |

OTHER PUBLICATIONS

Inoue "Superconductive transition of 120K in a Tl–Bi–Sr–Ca–Cu–O", *Jap Jnl Appl Phys.* vol. 28(7) Jul. 1987 pp. L1167–L1170.
Katsui "Crystal growht of superconducting Bi–Sr–Ca–Co–O . . ." *Jap Jnl Appl Phys.* vol. 27(5) May 1988 pp. L844–L845.

*Primary Examiner*—Paul Lieberman
*Assistant Examiner*—M. Kopec
*Attorney, Agent, or Firm*—Howard J. Greenwald

[57] ABSTRACT

There is disclosed a process for preparing a thallium-containing superconductive composition. In the first step of the process, a mixture of an inorganic salt (such as potassium chloride) and a powder compositon is provided; the powder composition contains at least three separate compounds which, in combination, correspond to the stoichiometry of the super-conductor to be produced. This mixture is then charged to a closed container, raised to a temperature of from 800–959 degrees Centigrade, and heated for from about 1 to about 12 hours; thereafter, it is cooled to a temperature of 600 degrees Centigrade at a rate of at least 300 degrees Celsius per hour.

9 Claims, 1 Drawing Sheet

PROCESS FOR PREPARING A THALLIUM-CONTAINING SUPERCONDUCTOR

CROSS REFERENCE TO RELATED PATENT APPLICATION

This application is a continuation-in-part of patent application Ser. No. 07/684,309, filed on Apr. 12, 1991, now U.S. Pat. No. 5,270,293.

FIELD OF THE INVENTION

A process for preparing a thallium/barium/calcium/copper superconductive material with a high onset temperature in which the materials used to form the superconductor are mixed and blended with an inorganic salt, the mixture is then heat-treated, and the salt is then leached from the heat-treated mixture.

BACKGROUND OF THE INVENTION

Superconductive materials containing thallium, barium, calcium, and copper cations are well known. Many of these materials have a relatively high onset temperature ("Tc"), allowing them to be used at higher temperatures than many of the older superconductive compositions.

The thallium family of superconductors has the general formula $Tl_aBa_2Ca_bCu_{b+1}O_c$, wherein a is from about 1 to about 2, b is from 0 to 2, and c is equal to $2(b+1)+4$. As is known to those skilled in the art, in such formula barium may be partially substituted by strontium up to about a mole ratio of about 1:1 of strontium to barium. Similarly, in such formula the thallium may be partially substituted by bismuth up to about a mole ratio of about 1:1 of bismuth to thallium. It is preferred, however, to have an embodiment in which there is no substitution of the thallium by bismuth and no substitution of the barium by strontium.

U.S. Pat. No. 5,039,653 of Jackson et al. discloses a process for growing a superconductor material in a fluxed melt. Although no specific examples of the use of this process to produce a thallium superconductor are disclosed in the Jackson patent, it is disclosed (at column 2 of the patent) that ". . . the invention is applicable to thallium-barium calcium cuprate superconductor material . . . ." The disclosure of this patent is hereby incorporated by reference into this specification.

In the examples of the Jackson et al. patent, which relate to the production of bismuth superconductor, a strontium carbonate and a bismuth oxide starting material are used. These materials, together with copper oxide and calcium hydroxide, were reacted, the resulting body was ground into a powder, and the powder was then mixed with sodium chloride and then heat-treated. Large crystals (on the order of at least about 2 millimeters diameter) in the form of platelets are formed in the process of Jackson et al.; these large crystals are taught to be useful for SQUID applications. Although these crystals may be useful for certain purposes, they are not desirable for use in spin on films and tape casting.

When the experiment described in the examples of the Jackson patent is modified to replace strontium carbonate with barium carbonate and bismuth oxide with thallium oxide, a superconductive material is formed. However, this material has a relatively low onset temperature.

It is an object of this invention to provide a process for the preparation of a thallium superconductor with a relatively high onset temperature.

It is another object of this invention to provide a process for the preparation of thallium superconductor which will require substantially less energy than the process of the Jackson patent.

It is yet another object of this invention to provide a process for the preparation of thallium superconductor wherein substantially all of the particles in such superconductor are smaller than about 20 microns.

It is yet another object of this invention to provide a process of thallium superconductor material which may be screen printed onto an alumina substrate to produce a circuit board with improved critical current density properties.

SUMMARY OF THE INVENTION

In accordance with this invention, there is provided a process for making a superconductive material selected from the group consisting of $Tl_2Ba_2CuO_6$, and $Tl_2Ba_2CaCu_2O_8$. In this process, the oxides of thallium, barium, calcium, and copper are charged in stoichiometric ratio to a crucible and mixed with an inorganic salt. The mixture is then heat treated with a specified heat-treatment regime.

BRIEF DESCRIPTION OF THE DRAWINGS

The invention will be described with reference to the following drawings, in which like reference numerals refer to like elements, and in which.

DESCRIPTION OF THE PREFERRED EMBODIMENTS

Figure 1:
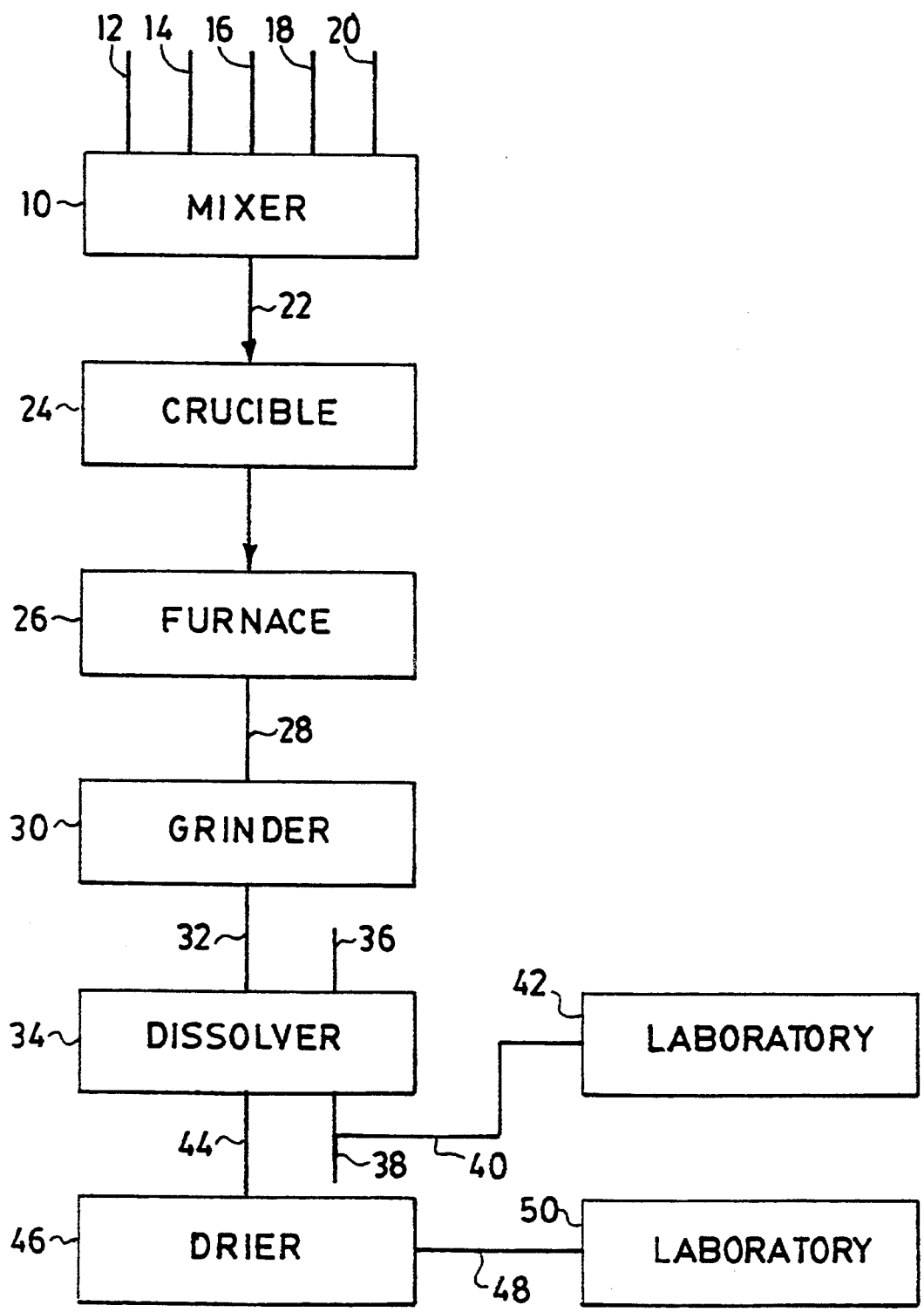
FIG. 1 is a flow diagram of the process of the invention.

In the first step of applicants' process, the reagents necessary to prepare the desired superconductor, in stoichiometric ratio, are charged to a container. The process works well when used to make either the $Tl_2Ba_2CuO_6$ or $Tl_2Ba_2CaCu_2O_8$ superconductive material. However, it does not work well for the preparation of the 1,2,1,2, the 1,2,2,3, or the 2,2,2,3 thallium/barium/calcium/copper compositions.

In the process of this invention, reagents are used with a particular particle size which, preferably, is less than about 100 microns. These reagents are preferably in the form of their oxides, and they are first mixed until a substantially homogeneous mixture is obtained.

Referring to FIG. 1, to mixer 10 is charged thallium oxide via line 12. One may use any of the commercially available thallium oxides. Thus, by way of illustration, one may use thallic oxide (catalog number 135 9173) sold by the Eastman Kodak Company of Rochester, N.Y.

The barium reagent is charged to mixer 10 via line 14. Although one may use barium oxide as the reagent, it is preferred to use barium peroxide. Any suitable barium peroxide reagent may be used. Thus, e.g., one may use reagent number J2609, barium peroxide, obtainable from the Atomergic Chemetals Corporation of Farmingdale, N.Y.

The calcium reagent is charged to mixer 10 via line 16. Inasmuch as calcium oxide is usually purer than its peroxide, it is preferred to charge the calcium compound as its oxide. Thus, e.g., one may use and charge reagent 24,856-8, calcium oxide, obtainable from the Aldrich Chemical Company of Milwaukee, Wis. In general, it is preferred to use reagents which are at least about 99 percent pure.

The copper reagent is charged to the mixer 10 via line 18. In one embodiment, cupric oxide (obtainable as reagent C472-500 from the Fisher Scientific Company of Pittsburgh, Pa.) may be used.

An inorganic salt may be added via line 20. Alternatively, the salt may be added in a subsequent processing step. The salt may be one or more alkali metal halides which is preferably selected from the group consisting of the chlorides, bromides, and iodides of sodium, potassium, cesium, rubidium, and mixtures thereof. In one preferred embodiment, the halides of potassium are preferred. One may use any of the commercially available salts such as, e.g., the potassium salts. Thus, one may use, for example, reagent number 11595 from the Johnson Matthey Electronics Company of Ward Hill, Me. (potassium chloride), reagent number 3164 from the J. T. Baker Chemical Company of Phillipsburg, N.J. (potassium iodide), reagent number P205-500 from the Fisher Scientific Company of Pittsburgh, Pa. (potassium bromide), and mixtures thereof.

Applicants have discovered that the use of one or more of the aforementioned potassium salts produces superconductor with excellent $T_c$ properties. However, when one uses sodium chloride, or a eutectic mixture of sodium chloride and potassium chloride, the $T_c$ properties obtained with the superconductor are substantially inferior.

The oxides are charged to mixer 10 in stoichiometric or substantially stoichiometric ratio. The salt is charged to mixer 10 (and/or to other vessels in the process) in an amount sufficient so that the mixture formed will contain from about 30 to about 80 weight percent (by total weight of the mixture) of such salt. In one embodiment, it is preferred to use from about 40 to about 60 weight percent of said salt. In another embodiment, from about 45 to about 55 weight percent of such salt is used.

The reagents charged to mixer 10 are mixed until they are substantially homogeneous. Any conventional means of mixing the reagents may be used. Thus, for example, they may be dry mixed by hand using a mortar and pestle.

It is preferred to charge the salt together with the oxides and to only conduct one mixing operation. However, one might prereact the mixture of reagents without salt and thereafter add salt.

Once the required mixture of salt and oxide reagents has been provided, it is then charged via line 22 to a crucible (such as crucible 24), which, after the reagents have been so charged, is preferably closed to prevent the escape of thallium oxide and/or salt therefrom. Any suitable closed crucible may be used such as, e.g., crucibles consisting essentially magnesium oxide or alumina.

The crucible containing the reagent mixture is then charged to a furnace 26 which, preferably, is equipped with a programmable controller. Any such suitable furnace may be used. Thus, for example, one may use a Fisher Isotemp Programmable Furnace, Model 495A, obtainable from the Fisher Scientific Company of Pittsburgh, Pa. (see the 1991-1992 catalog, page 865).

The material in the closed crucible is then heat-treated. In the first step of the heat-treatment process, the temperature of the mixture is raised from ambient to a temperature of from about 800 to about 950 degrees Celsius at a rate of from about 100 to about 900 degrees Celsius per hour. It is preferred to raise the temperature of the mixture from ambient to a temperature of from about 800 to about 900 degrees Celsius at a rate of from about 300 to about 900 degrees Celsius.

In the second step of the heat-treatment process, after the reaction mixture has been brought to the desired temperature, it is maintained at such temperature of from about 800 to about 950 degrees Celsius for from about 1 to about 12 hours. It will be appreciated by those skilled in the art that a longer reaction time will be required when a lower reaction temperature is used, and vice versa. In general, however, it is preferred to conduct this heating step for from about 1 to about 3 hours.

In the third step of the heat-treatment process, after the reaction mixture has been maintained at the reaction temperature for the desired time, it is cooled to ambient. In the process of the instant invention, the reacted mixture is cooled relatively quickly. By comparison, in the examples illustrated in U.S. Pat. No. 5,039,653 of Jackson et al., cooling from a temperature of the reaction temperature to a temperature of 760 degrees Celsius required 45 hours.

In applicants' process, the reacted mixture is cooled from the reaction temperature to a temperature of 600 degrees Celsius at a rate of at least about 300 degrees Celsius per hour; in general, less than 1.5 hours is needed for this stage of the cooling. The use of this relatively rapid cooling regime insures the production of the desired fine particles with platey morphology, which are suitable for tape casting, screen printing, and spin coating applications.

After the reaction mixture has been cooled to 600 degrees Celsius in accordance with the regime described above, it may then be furnace cooling. For this stage of cooling, the cooling rate is not critical.

The cooled particles are then charged via line 28 to grinder 30, wherein they are comminuted until substantially all of their particles are preferably smaller than 50 microns. Then the ground particles are preferably charged via line 32 to another container, such as dissolver 34, in which the inorganic salt is leached from the crushed particles.

To dissolver 34, in addition to the crushed reacted mixture, is charged a dissolving agent via line 36. One may use as such dissolving agent water, alcohols of the formula ROH (wherein R is alkyl containing from about 1 to about 8 carbon atoms), acetone, and the like.

The preferred dissolving agent is water. One may use hot water or cold water, it being preferred to use water at ambient temperature. The water may be continually passed into the system via line 36, filtrate may continually be removed from the system via line 38, and samples of filtrate may be periodically passed via line 40 to laboratory 42 to determine whether the filtrate contains cations or anions. When analysis in laboratory 42 indicates that the filtrate does not contain any potassium cation or any chloride, bromide, or iodide anion, the filtration step may be ended.

The filtered reaction mixture may then be passed via line 44 to drier 46, wherein it may be dried to a moisture content of less than about 0.1 weight percent. Samples of the dried material may be passed via line 48 to laboratory 50, wherein it is subjected to analysis to determine what phases are present and what shape particles are present. The analytical techniques used in laboratory 50 are well known to those skilled in the art and are described, e.g., in (1)J. I. Goldstein and H. Yakowitz, "Practical Scanning Electron Microscopy" (Plennum Press, New York, 1975), (2)J. I. Goldstein et al., "Scanning Electron Miscroscopy and X-ray Microanalysis" (Plennum Press, New York, 1981), (3)Metals Handbook, Ninth Edition, Volume 10, "Materials Characterization," and (4) B. D. Cullity, "Elements of X-ray Diffraction," Second Edition (Addison Wesley and Sons, 1978). The disclosure of each of these references is hereby incorporated by reference into this specification.

The dried material may be analyzed by powder X-Ray Diffraction in laboratory 50 with conventional X-ray diffractometery apparatus. Thus, by way of illustration, one may use either of two different diffractometers, a Siemens D500/D5000 Diffractometer (Kristalloflex 810, manufactured by the Siemens Company of West Germany), and an automated Noreclo X-ray diffraction unit (manufactured by Phillips Electron Instruments, Mount Vernon, N.Y.) using copper K-alpha radiation, a diffracted beam graphite monochromator, a step size of 0.02 degrees, and a count time of 1 second.

The temperature of the superconducting transition, Tc, may be evaluated in laboratory 50 in accordance with the procedure described in a paper by M. Pistakis and X. Wang entitled "Automated Superconductor Measurements System," The Review of Scientific Instrumentation, 60(1), pages 135-160, January, 1989. A Keithly current source providing about 1 milliampere to the sample (model number 228A, Keithly Instrument, Inc., Cleveland, Ohio) may be used. A Keithly multimeter (model 195) may be used as a voltmeter to measure the voltage drop across the superconductor sample due to the current. The resistance of the sample at a given temperature is equal to the voltage divided by the current. Another Keithly multimeter (model 196) may be used as a voltmeter for the thermocouple.

The morphology of the dried powder may be evaluated in laboratory 56 by the use of conventional scanning electron microscope apparatus. Thus, by way of illustration, one may use two different electron microscopes, one for secondary imaging (such as, e.g., an Amray 1810 scanning electron microscope, available from the Amray Company of Bedford, Ma.), and another for E.D.S. analysis (such as, e.g., an ETEC autoscan, available from the ETEC Company of Hayward, Calif.

FORMING OF THE DRIED POWDER INTO A CERAMIC BODY

The dried powder from drier 52 may be passed via line 58 to former 60, wherein it may be formed into a ceramic body by conventional ceramic techniques. Thus, for example, one may use the techniques described in James S. Reed's "Introduction to the Principles of Ceramic Processing" (John Wiley & Sons, Inc., New York, 1988), the disclosure of which is hereby incorporated by reference into this specification.

PREPARATION OF A TAPE EAST FILM

In one preferred embodiment, a film is formed from the dried powder by a tape casting process. As is known to those skilled in the art, tape casting is a process of forming a film of controlled thickness when a slurry flows down an inclined substrate or under a blade onto a supporting surface. The process is generally referred to as continuous tape casting when the blade is stationary and the supporting surface moves, and batch doctor blade casting when the blade moves across the stationary, supporting surface covered with slurry. See, e.g., pages 395-399 of the aforementioned Reed book.

The dried, sieved particles may be mixed with binder and solvent to form a slurry. As is well known to those skilled in the art, any combination of binder and solvent may be used which will provide the necessary rheological properties to the tape to be formed by the tape casting process.

The binders, slurries, and plasticizers which may be used in the tape-casting process are discussed in great detail in (1) an article by J. C. Williams entitled "Doctor-Blade Process" appearing at pages 178-198 of "Treatise on Materials Science and Technology," Volume 9, "Ceramic Fabrication Process," edited by F. Y. Wang (Academic Press, 1976), and (2) an article by R. E. Mistler et al. entitled "Tape Casting of Ceramics," appearing at pages 411-448 of "Ceramic Processing Before Firing," edited by G. Onoda et al. (Wiley Interscience, New York, 1976).

Thus, a commercially available binder which is comprised of toluene solvent, ethanol solvent, and polyvinyl butaryl thermoplastic resin, may be used. This binder, which is identified as "B-73305 Substrate Binder," is obtainable from Metoramic Sciences, Inc. of 6510A Yarrow Drive, Carlsbad, Calif. 92009.

In one preferred embodiment, binder additions to the batch are made in the amount of 40-45 percent, by weight. Toluene, in the amount of 5-7 percent by weight, also may be used to maintain the desired rheological properties. The batch, with the binder and solvent, may be ball milled for 12 hours with zirconia media and thereafter tape cast on glass using a hand held doctor blade to control the slurry thickness; the blade height may be set at 0.01 inch. A solution of pure lecithin, dissolved at a 1.5 weight percent ratio with 1,1,1 trichloroethylene, may be used as a releasing agent.

PREPARATION OF LAMINATED BODIES

Different shapes and sizes of green bodies may be formed by laminating the tapes made by the tape casting process. The lamination process is well known to those skilled in the art and is described, e.g., in the aforementioned J. C. Williams and R. E. Mister et al. papers.

By way of illustration and not limitation, green tapes may be cut into one inch square pieces and laminated in a one inch square die with between from 15 to 20 layers of green tape. The die may then be brought to a stable temperature near the glass transition temperature of the binder through the use of heating plates on a hydraulic press; thus, e.g., one may use a lamination temperature of 70-75 degrees Centigrade, a pressure of about 35 megaPascals, and a time of 2-3 minutes. The one inch laminated monolith thus formed may be trimmed on all edges and diced into individual compacts with dimensions of about 20×4 millimeters.

PREPARATION OF A LAMINATE CONTAINING CERAMIC AND METAL

A laminated body containing alternate layers of superconductive material and metal may be prepared by a process analogous to that used to make ceramic capacitors.

In this process, tape cast superconductive tape may be produced in accordance with the procedure described above. Because the grain-oriented superconducting tape is formed in layers, metal conductor ink may be printed on each layer as in ceramic capacitors, only in a continuous (and not separated) layer. In this way, layers of conductor(metal) and superconductor(- ceramic) can be formed together like layers of cloth and paint.

The multi-layered compact thus formed can be cut and formed, or bent into shape (such as, e.g., into curved shapes and/or spiral shapes) and then sintered into a solid object containing both superconductor material and metal.

In one preferred embodiment, a tape consisting essentially of ceramic material may be cast and cut, and metal ink may be printed on the tape in a desired pattern. A separate tape consisting essentially of insulating material may also be cast and cut. Thereafter, a laminate may be prepared by adhering one or more layers of the ceramic/metal tape with one or more layers of the insulating tape, and the laminated material may be cut to shape and/or formed into various shapes.

In yet another embodiment, a tape comprised of superconductive ceramic material, or superconductive ceramic material and metal conductor is prepared. In this embodiment, once the superconductor (or the superconductor and metal conductor strip) has been cut to size, it is coated with an insulating layer, which is applied by conventional spray or dip processing. The insulating material is preferably comprised of compatible oxides from the thallium/calcium/copper/barium oxide systems.

In one aspect of this embodiment, it is preferred that the insulating tape is cast from the same type of material as the superconductor tape binder system. The laminate produced in this aspect would dry and allow the superconductor strips to be bent so they could touch but not short circuit.

In one embodiment, insulating layers of material are laminated into a stack to separate superconducting layer; and the layers are preferably fired at the same time. Inasmuch as many tape casting systems form tape which, even after lamination, is still flexible, the tape cast material can be bent, rolled, or coiled to complex shapes. Once so shaped, the green body can be heated to burn off the organic binder and heated still higher to sinter it.

In one preferred embodiment of the invention, one may use laminating to produce tape layers that run in the direction of current flow.

The following Examples are presented to illustrate the claimed invention but are not to be deemed limitative thereof. Unless otherwise specified, all parts are by weight, and all temperatures ale in degrees Celsius.

EXAMPLE 1

9.04 grams of thallium oxide, 6.70 grams of barium peroxide, 1.11 grams of calcium oxide, 3.15 grams of copper oxide, and 20 grams of potassium chloride were charged to a mortar and pestle and hand mixed for about 30 minutes. Thereafter, the mixture was charged to a magnesia crucible and covered. The covered crucible was then placed into a furnace.

The temperature of the furnace was raised from ambient temperature to 900 degrees Celsius over a period of 90 minutes. Thereafter, the mixture was subjected to the temperature of 900 degrees Celsius for 1 hour. Thereafter, the mixture was cooled to a 600 degrees Celsius over a period of 30 minutes. Then the mixture was furnace cooled to ambient temperature.

The cooled mixture was then charged to a mortar and pestle and crushed for several minutes until substantially all of its particles were smaller than 50 microns. The crushed particles were then charged into a one-liter beaker and repeatedly washed with cold deionized water until the wash water contained neither potassium nor chloride ions. The washed particles were then filtered on filter paper to remove water from them.

The filtered particles were then placed in an oven and heated to a temperature of 70 degrees Celsius until they contained less than about 0.01 weight percent of water.

The Tc of the dried particles was determined in accordance with the procedure described in the specification. It was 110 degrees Kelvin.

The dried particles were studied under a scanning electron microscope, which revealed the presence of small platelets in the particles on the order of about 10 by 10 microns.

EXAMPLE 2

The procedure of Example 1 was followed, with the exception that potassium iodide rather than potassium chloride was used. The Tc of the powder obtained was 110 degrees Kelvin.

EXAMPLE 3

The procedure of Example 1 was followed, with the exception that the potassium bromide rather than potassium chloride as used. The Tc of the powder obtained was 110 degrees Kelvin.

EXAMPLE 4

The procedure of Example 1 was followed, with the exception that sodium chloride was used rather than potassium chloride. The Tc of the powder obtained was 80 degrees Kelvin.

EXAMPLE 5

The procedure of Example 1 was followed with the exception that a 50/50 molar mixture of sodium chloride and potassium chloride was used, and the temperature used in the heating step was 850 degrees Celsius. The Tc of the powder obtained was 87 degrees Kelvin.

EXAMPLE 6

The procedure of Example 1 was followed, with the exception that a sufficient amount of oxides were used to form the 2201 composition, and a 50/50 mixture of sodium chloride and potassium chloride was used as the salt.

EXAMPLE 7

The procedure of Example 1 was followed to produce about 25 grams of the dried powder. 25.0 grams of such powder were then mixed with 6.30 grams of B-73305 Substrate Binder (available from Metoramic Sciences Inc. of Carlsband, Calif.) and 0.16 grams of M-111 Binder Modifier (also available from the Metoramic Company), and 5.0 grams of toluene. This mixture was then ball milled using zirconia media for 24 hours to produce a substantially homogeneous mixture.

The slurry so produced was then tape cast, using the doctor blade method. Rectangular samples of tape with a thickness of about 0.1 millimeters were produced.

The green tape was studied using the scanning electron microscope and the x-ray diffraction. Analysis revealed substantial grain orientation was obtained by the doctor blade method.

The green tape samples were then laminated in accordance with the procedure described in the specification at 75 degrees Celsius and about 3,000 p.s.i. pressure for 5.0 minutes, using a press.

The laminate so formed was then charged to a tube furnace and heated from ambient (at the rate of 1 degree Celsius per minute) to a temperature of 500 degrees Celsius. Thereafter it was cooled to ambient a rate of 4 degrees Celsius per minute.

The debindered sample was then sintered in a closed crucible. The laminated samples were charged to an alumina crucible, and they were then packed with loose 2212 powder made in accordance with the procedure of Example 1; all of the surfaces of the laminated tape were covered with such powder. The crucible then was covered, and the covered crucible was charged to a preheated furnace at a temperature of 890 degrees Celsius. It was maintained under these conditions for 30 minutes, after which it was removed from the furnace and cooled to ambient in air.

EXAMPLE 8

A slurry was prepared in accordance with the procedure described in Example 7. Thereafter, about 15 weight percent of toluene was added to the slurry to dilute it.

The dilute slurry thus produced was dripped onto a magnesia single crystal substrate. (10 mm.×10 mm×less than 1.0 millimeter magnesia substance, This substrate was then spin cast on a "Photo Resist Spinner" spin caster, modell-EC101d-R485, manufactured by the Headway Research, Inc. of Garland, Tex. The substrate was rotated on this device at a speed of 1,000 r.p.m. while the dilute slurry was dripped onto its surface.

The coated substrate thus formed was then debindered and then sintered in accordance with the procedure of Example 7.

EXAMPLE 9

The procedure of Example 1 was substantially followed, with the exceptions that 9.57 grams of thallium oxide, 7.1 grams of barium peroxide, 3.33 grams of coppr oxide, and 20 grams of potassium chloride were charged to the mortar and pestle.

EXAMPLE 10

The procedure of Example 9 was substantially followed, with the exception that a 50/50 molar mixture of sodium chloride and potassium chloride was used.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A process for preparing a thallium-containing superconductive composition, comprising the steps of:
    (a) providing a mixture of an inorganic salt and a precursor powder composition, wherein said precursor powder composition has a stoichiometry corresponding to a formula selected from the group consisting of $A_2B_2CuO_6$, and $A_2B_2CaCuO_8$, and wherein:
        1. A is thallium,
        2. B is barium,
        3. substantially all of the particles of said precursor powder composition are smaller than about 100 microns, and
        4. said mixture is comprised of from about 30 to about 80 weight percent of said inorganic salt;
    (b) charging said mixture of said inorganic salt and said precursor powder composition to a closed container;
    (c) thereafter, while said mixture is within said closed container, raising the temperature of said mixture from ambient temperature to an elevated temperature of from about 800 to about 950 degrees Celsius at a rate of from about 100 to about 900 degrees Celsius per hour;
    (d) thereafter, while said mixture is within said closed container, subjecting said mixture to said elevated temperature of from about 800 to about 950 degrees Celsius for from about 1 to about 12 hours;
    (e) thereafter, cooling said mixture within said closed container from said elevated temperature to a temperature of 600 degrees Celsius at a rate of at least 300 degrees Celsius per hour, whereby said thallium-containing superconductive composition is produced.

2. The process as recited in claim 1, wherein said inorganic salt is a potassium salt selected from the group consisting of potassium chloride, potassium bromide, potassium iodide, and mixtures thereof.

3. The process as recited in claim 1, wherein said powder mixture is comprised of barium peroxide.

4. The process as recited in claim 1, wherein mixture is comprised of from about 45 to about 55 weight percent of said inorganic potassium salt.

5. The process as recited in claim 1, wherein said closed container is a closed crucible.

6. The process as recited in claim 1, wherein, while said mixture is within said closed container, the temperature of said mixture is raised from ambient temperature to an elevated temperature of from about 800 to about 900 degrees Celsius at a rate of from about 300 to about 900 degrees Celsius per hour.

7. The process as recited in claim 1 wherein, after said mixture has been cooled within said closed container, it is washed with solvent until substantially all of said inorganic salt has been leached from said powder composition.

8. The process as recited in claim 7, wherein said solvent is water.

9. The process as recited in claim 7 wherein, after said mixture has been washed with said solvent, it is dried until it contains less than about 0.1 weight percent of moisture.

* * * * *